United States Patent [19]

Bly

[11] 4,160,907

[45] Jul. 10, 1979

[54] THERMO-OPTICAL FAR INFRARED SYSTEM

[75] Inventor: Vincent T. Bly, Alexandria, Va.

[73] Assignee: The United States of America as represented by the Secretary of the Army, Washington, D.C.

[21] Appl. No.: 875,969

[22] Filed: Feb. 8, 1978

[51] Int. Cl.² .............................................. H01J 31/49
[52] U.S. Cl. ..................................... 250/330; 250/334
[58] Field of Search ......................... 250/330, 332, 334

[56] References Cited

U.S. PATENT DOCUMENTS 3,919,555  11/1975  Singer ................................. 250/332
3,939,346  2/1976   Tutihashi ............................ 250/330

Primary Examiner—Davis L. Willis
Assistant Examiner—Janice A. Howell
Attorney, Agent, or Firm—Nathan Edelberg; Milton W. Lee; Aubrey J. Dunn

[57] ABSTRACT

A forward-locking far infrared system employing a modulator for infrared radiation directed onto one side of a thermal-to-optical transducer. The transducer also has directed onto the same side visible or near infrared radiation. The transducer thus produces a visible or infrared transmission or reflection image of the far infrared scene. This image is detected by an accoupled optical amplifier which provides a signal for a visible display.

4 Claims, 3 Drawing Figures

THERMO-OPTICAL FAR INFRARED SYSTEM

The invention described herein may be manufactured, used, and licensed by the U.S. Government for governmental purposes without the payment of any royalties thereon.

BACKGROUND OF THE INVENTION

There are many well known types of far infrared imaging systems which are described in detail in texts such as *The Detection and Measurement of Infrared Radiation*, by R. A. Smith et al. The instant invention differs from these by using a unique, two step, thermo-optical imaging process. Several systems have been proposed using a thermal-to-optical transducer; however, in these the transducer was required to convert from the far infrared to the visible and to provide sufficient contrast for direct visual observation. In the instant invention, the transducer is only required to make the far infrared-to-optical conversion, with the contrast enhancement provided by the ac-coupled optical amplifier. Relaxation of the output contrast requirements of the transducer dramatically improves the resolution, time response, and thermal sensitivity of the system. The advantages of this approach over previous methods are discussed in my article entitled *Advanced FLIR Concepts* presented at the IRIS Imaging Specialty Group Meeting at El Toro Marine Base, California, in Feb. of 1977 and published in the IRIS proceedings.

SUMMARY OF THE INVENTION

The invention consists of five major components. These are: a far infrared objective lens (or mirror system); an infrared modulator, or chopper, whose "off" state approximates the mean background temperature; a thin film thermal-to-optical transducer in an evacuated cell; a visible or near infrared read beam light source; an ac-coupled visible imaging system; and an output image display, or an electronic processor for guidance or tracking applications. The objective forms a thermal image on the transducing film. Because of the modulator, this image includes a time varying signal which is locally proportional to the difference in temperature of the corresponding scene element compared to the apparent "off" state temperature of the modulator. The transducing film is uniformly illuminated by the read beam. Since the transducing film includes a layer whose complex index of refraction varies with temperature, its local transmission (or reflection) is proportional to the thermal image. In this way, an optical image is produced, at the read beam wavelength, corresponding to the thermal image, including the time varying portion induced by the modulator chopper. This optical image is amplified by the ac-coupled visible (or near infrared) imaging system. Since it is ac-coupled, only the time varying portion of the signal is amplified. Therefore, the static background level is suppressed yielding a high contrast signal which can be fed directly to a visible display or a missile guidance system.

DETAILED DESCRIPTION OF THE INVENTION

Figure 1:
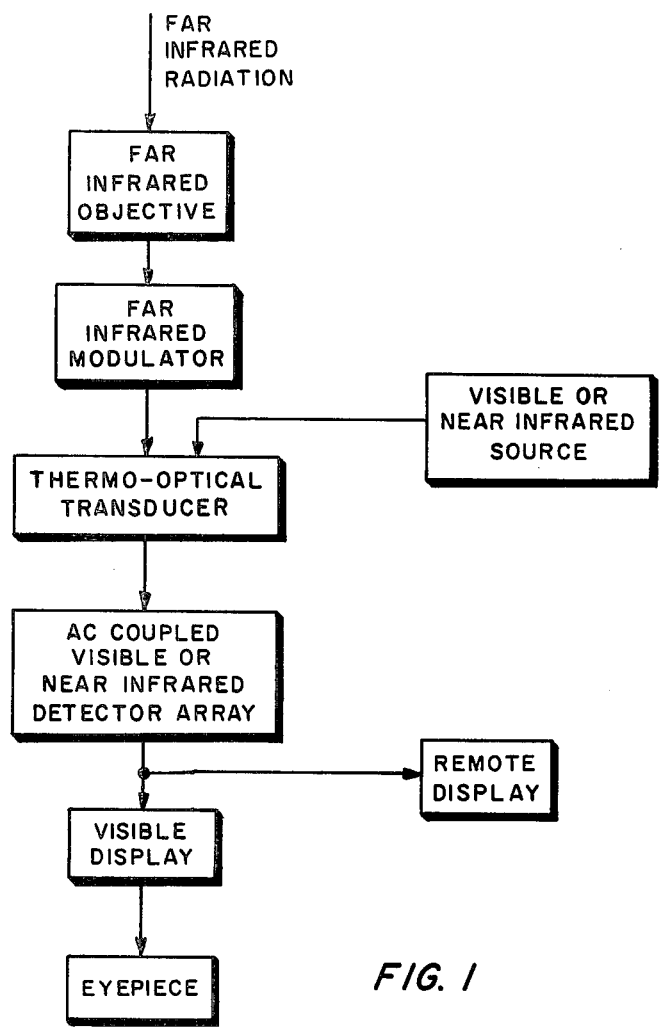
FIG. 1 shows a schematic block diagram of the invention.

The invention may perhaps be best understood by referring to the drawings, in which FIG. 1 far infrared radiation being focussed onto a thermo-optical transducer through a far infrared modulator by a far infrared objective. The transducer responds to an infrared image to produce a visible image, as will be further described below. A visible or near infrared source illuminates the transducer with a flood of illumination from the same side as the far infrared radiation. The image on the transducer is detected by an ac-coupled visible or near infrared detector array or its equivalent to produce an output which may be used for a remote display, or which may produce a local visible display. This local display may be viewed through an eyepiece by a viewer.

Figure 2:
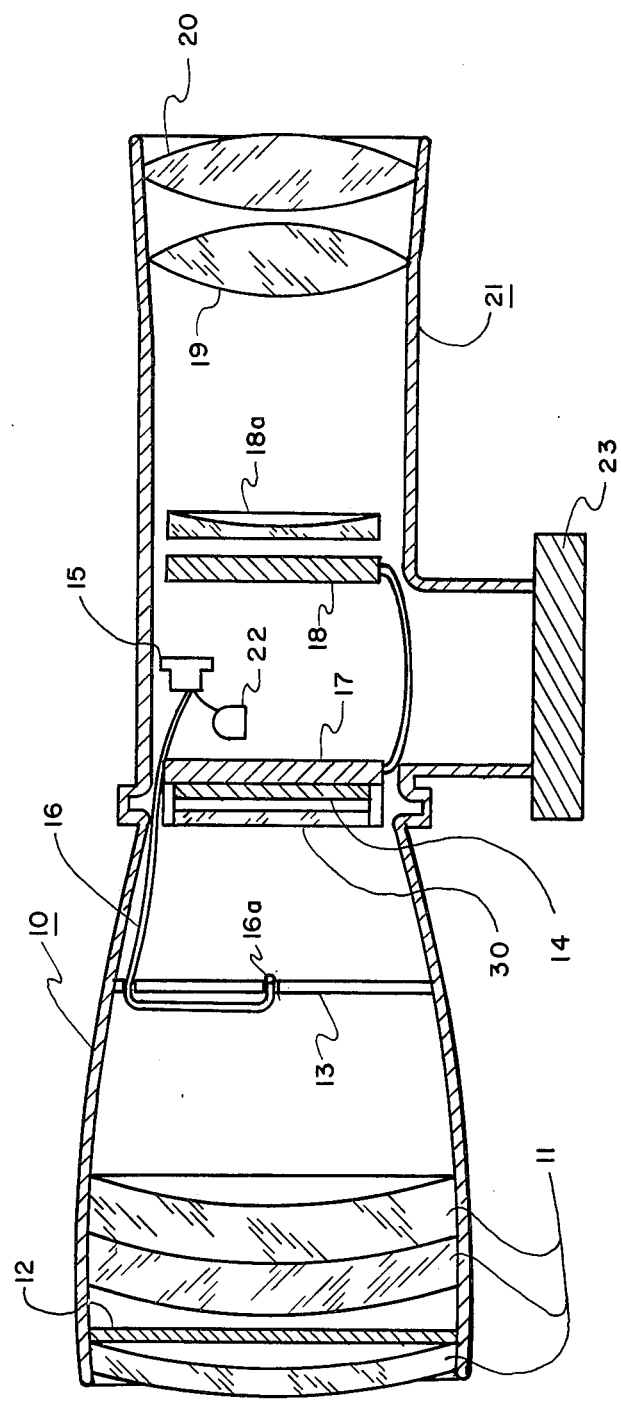
FIG. 2 shows a schematic-diagramatic view of the invention.

The invention is shown in some detail in FIG. 2 wherein may be seen housing 10 containing far infrared optics 11 and shutter or modulator 12. An infrared scene is focussed by lenses 11 past spider 13 onto transducer 14 in a vacuum cell with window 30. This transducer is illuminated by a read radiation from laser diode 15 and optical fiber 16. The end of fiber 16 includes lens 16a which produces a flood of illumination on 14. On the opposite side of the transducer is imaging detector 17. Preferably 14 is an absorption-edge transducer. Such transducers take advantage of the temperature dependance in the optical absorption spectrum of a thin semiconducting film, such as vitreous selenium. A far infrared image on transducer 14 thus makes incremental areas on 14 vary in transmissivity for read radiation from laser diode 15 (which mayprovide visible or near infrared radiation). Imaging detector 17 will thereby be provided with a visible or near infrared image corresponding to the far infrared image. This detector 17 is preferably a two-dimensional array of ac-coupled CCDs. The individual detectors of the array are ac-coupled in that a series capacitance is used between each detector and its preamplifier. An example of such a detector array is that described in "A CCD Multiplexer with Forty AC Coupled Inputs", by J. T. Hall et al, published in the *Proceedings of the* 1975 International Conference on the Application of Charge-Coupled Devices, sponsored by Naval Electronics Laboratory Center (NELC), San Diego, Calif., in October 1975. Such a detector array must include a two-dimentional array of CCD detectors each capacitance coupled to an individual preamplifier, and further including a scanner for sequentially interrogating each detector. Such a system is shown in U.S. Pat. No. 3,808,435 of Apr. 30, 1974. The output of 17 feeds flat display 18 to provide a visible image. This visible image is directed by field flattner lens 18a to lenses 19 and 20 in eyepiece 21. The eyepiece thus provides a visible image on the far infrared scene for a viewer. Obviously the video output of detector 17 may feed remote crt displays or the like.

Figure 3:
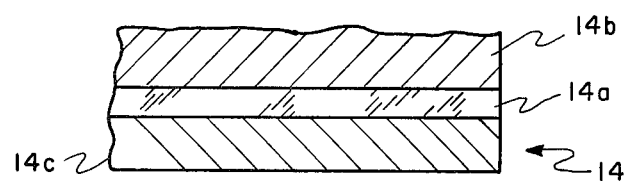
FIG. 3 shows a partial cross-section of the transducer of the invention.

A detailed view of a portion of transducer 14 is shown in FIG. 3, wherein 14a designates a cellulose nitrate substrate approximately 500 Å thick. On one side of a 14a is a layer 14b of vitreous selenium approximately 1500 Å thick; on the other side is a layer of gold black 14c having a mass of approximately $4.0 \times 10^{-5}$ gm/cm$^2$. The portion output of laser diode 15 is sensed by a photodetector 22. This detector provides an input to a stabilizing circuit (not shown) for diode 15 whereby the output of 15 is maintained at a constant value. The stabilizing circuit may include a transistor or equivalent to control current from a source (not shown) to diode 15.

Display 18 is any one of the well known flat displays such as those shown in Vol. 17, No. 1, First Quarter, 1976 of the *Proceedings of the Society of Information Display*.

Housing 10 has formed integral therewith foot 23 which may be adapted for mounting on tripod or other mounting means.

My invention thus provides an image at its eyepiece or at some remote location as described in the Summary of the Invention, above, and as described in my article discussed in the Background of the Invention.

Although I have described the invention transducer as being vitreous selenium, etc. it may obviously take other forms, such as arsenic modified sellium-tellerium glass. This glass has a higher softening temperature than vitreous selenium and can easily be matched to the output of a GaAlAs laser diode. Other materials, such as $HgI_2$, $PbI_2$, $(DMA)_3 CuCl_5$ and the dye Rhodamine C may also be used. Also, a mechanical or other type of chopper or modulator may be carried external to housing 10 in place of modulator 12.

It should be understood that housing 10 of FIG. 2 may include the various electronics for scanning in detector 18 and for control of diode 15, as well as any batteries for supplying power to 15, 17, and 18.

I claim:

1. An infrared imaging device including a thin-film thermal-to-optical transducer having an image side and an other side;
    means for projecting an infrared image on said image side of said transducer;
    a chopper interposed between said means and said transducer;
    radiation producing means for projecting a read radiaton on said image side of said transducer;
    scanning image detecting means adjacent said transducer on said other side; and
    image display means connected to said image detecting means.

2. The device as set forth in claim 1 wherein said transducer is an absorption-edge transducer.

3. The device as set forth in claim 2 wherein said means for projecting a read radiation is a stabilized laser diode.

4. The device as set forth in claim 2 wherein said transducer is taken from the group consisting of arsenic modified sellium-tellurium glass, $HgI_2$, $PbI_2$, $(DMA)_3 CuCl_5$, and the dye Rhodamine C.

* * * * *